(12) United States Patent
Larcher et al.

(10) Patent No.: US 7,939,040 B2
(45) Date of Patent: *May 10, 2011

(54) COMPOSITION BASED ON CERIUM OXIDE AND ON ZIRCONIUM OXIDE HAVING A HIGH REDUCIBILITY AND HIGH SPECIFIC SURFACE, METHODS FOR THE PREPARATION THEREOF AND USE AS A CATALYST

(75) Inventors: Olivier Larcher, Perigny (FR); Emmanuel Rohart, Sainte Soulle (FR)

(73) Assignee: Rhodia Operations, Aubervilliers (FR)

( * ) Notice: Subject to any disclaimer, the term of this patent is extended or adjusted under 35 U.S.C. 154(b) by 366 days.

This patent is subject to a terminal disclaimer.

(21) Appl. No.: 10/568,853

(22) PCT Filed: Sep. 2, 2004

(86) PCT No.: PCT/FR2004/002237
§ 371 (c)(1),
(2), (4) Date: Aug. 9, 2006

(87) PCT Pub. No.: WO2005/023728
PCT Pub. Date: Mar. 17, 2005

(65) Prior Publication Data
US 2007/0189955 A1    Aug. 16, 2007

(30) Foreign Application Priority Data
Sep. 4, 2003   (FR) ...................... 03 10471

(51) Int. Cl.
| | |
|---|---|
| C01F 17/00 | (2006.01) |
| C01G 25/02 | (2006.01) |
| C01G 28/00 | (2006.01) |
| C01G 30/00 | (2006.01) |
| C01B 21/00 | (2006.01) |
| C01B 23/00 | (2006.01) |
| C01B 25/00 | (2006.01) |
| C01B 31/00 | (2006.01) |
| C01B 33/00 | (2006.01) |
| C01B 35/00 | (2006.01) |
| B01D 53/56 | (2006.01) |
| B01D 53/94 | (2006.01) |
| B01J 8/02 | (2006.01) |
| B01J 23/00 | (2006.01) |
| B01J 23/10 | (2006.01) |
| B01J 21/04 | (2006.01) |
| B01J 23/02 | (2006.01) |

(52) U.S. Cl. ............... 423/263; 423/594.12; 423/213.2; 423/213.5; 502/304; 502/325; 502/349; 502/439

(58) Field of Classification Search .............. 502/349, 502/439, 302–304, 325; 423/594.12, 263, 423/213.2, 213.5
See application file for complete search history.

(56) References Cited

U.S. PATENT DOCUMENTS

| | | | |
|---|---|---|---|
| 6,191,061 B1 * | 2/2001 | Takada et al. ............... 502/66 |
| 6,214,306 B1 | 4/2001 | Aubert et al. | |
| 6,248,688 B1 | 6/2001 | Wu et al. | |
| 6,399,537 B1 * | 6/2002 | Graham .................... 502/304 |
| 6,506,705 B2 * | 1/2003 | Blanchard et al. ............ 502/300 |
| 7,166,263 B2 * | 1/2007 | Vanderspurt et al. ......... 423/263 |
| 2002/0115563 A1 * | 8/2002 | Blanchard et al. ............ 502/304 |

FOREIGN PATENT DOCUMENTS

| | | |
|---|---|---|
| EP | 0 778 071 A1 | 6/1997 |
| EP | 0 955 267 A1 | 11/1999 |
| EP | 1 053 779 A1 | 11/2000 |
| FR | 2 756 819 | 6/1998 |
| WO | WO 98/16472 | 4/1998 |
| WO | WO 98/45212 | 10/1998 |
| WO | WO 03/020643 A1 | 3/2003 |

OTHER PUBLICATIONS

Vidmar et al. "Effects of Trivalent Dopants on the Redox Properties of Ce0.6Zr0.4O2 Mixed Oxide," Journal of Catalysis 171, 160-168 (1997).*
Gonzalez-Velasco et al., "Contribution of cerium/zirconium mixed oxides to the activity of a new generation of TWC," Applied Catalysis B: Enviornmental 22 (1999) 167-178.*
Database CA Chemical Abstract, XP-002199922, Yang Shibo et al., "CeO2-Zr02 solid solutions prepared by modified sol-gel method and their characteristics".
Brunauer et al., "Adsorption of Gases in Multimolecular Layers", *J. Chem. Soc*, vol. 30, Feb. 1938, pp. 309-319.

* cited by examiner

*Primary Examiner* — Stanley Silverman
*Assistant Examiner* — Anthony J Zimmer
(74) *Attorney, Agent, or Firm* — Buchanan, Ingersoll & Rooney, P.C.

(57) ABSTRACT

The inventive composition is based on cerium oxide and on zirconium oxide in an atomic proportion Ce/Zr of at least 1, and has a reducibility rate of at least 70% and a surface area of at least 15 m; 2; /g. This composition is obtained by a method in which: a mixture is made containing cerium and zirconium compounds; this mixture is provided with a basic compound whereby obtaining a precipitate that is heated in an aqueous medium; a surfactant-type additive or a polyethylene glycol or a carboxylic acid is added to this medium or to the separated precipitate; the mixture is ground; the precipitate obtained thereof is calcined under inert gas or vacuum, in a first period of time, at a temperature of at least 850° C. and then under an oxidizing atmosphere, in a second period of time, at a temperature of at least 400° C.

25 Claims, No Drawings

COMPOSITION BASED ON CERIUM OXIDE AND ON ZIRCONIUM OXIDE HAVING A HIGH REDUCIBILITY AND HIGH SPECIFIC SURFACE, METHODS FOR THE PREPARATION THEREOF AND USE AS A CATALYST

This application is an application under 35 U.S.C. Section 371 of International Application Number PCT/FR2004/002237 filed on Sep. 02, 2004.

The present invention relates to a composition based on cerium oxide and on zirconium oxide having a high reducibility and a high specific surface, to processes for the preparation thereof and to the use thereof as catalyst.

"Multifunctional" catalysts are currently used for the treatment of exhaust gases from internal combustion engines (automobile afterburning catalysis). The term "multifunctional" is understood to mean catalysts capable of carrying out not only oxidation, in particular of carbon monoxide and hydrocarbons present in exhaust gases, but also reduction, in particular of nitrogen oxides also present in these gases ("three-way" catalysts). Zirconium oxide and cerium oxide today appear as two constituents which are particularly important and advantageous for this type of catalyst. To be effective, these catalysts must exhibit a high specific surface, even at high temperature.

Another quality required for these catalysts is reducibility. The term "reducibility" is understood to mean, here and for the remainder of the description, the ability of the catalyst to be reduced in a reducing atmosphere and to be reoxidized in an oxidizing atmosphere. This reducibility can be measured, for example, by consumption of hydrogen in a given temperature range. It is due to the cerium, in the case of the compositions of the type of those of the invention, cerium having the property of being reduced or of being oxidized. This reducibility should, of course, be as high as possible.

In point of fact, in the current state of the art, it appears that these two characteristics are often difficult to reconcile, in particular for compositions with a high cerium content, that is to say that a high reducibility in a composition has the counterpart of a rather low specific surface.

The object of the invention is to provide a composition of this type which exhibits, in combination, a high specific surface and a high reducibility.

With this aim, the composition according to the invention is based on cerium oxide and on zirconium oxide in a Ce/Zr atomic proportion of at least 1 and it is characterized in that it exhibits a level of reducibility of at least 70% and a specific surface of at least 15 m$^2$/g.

The invention also relates to a process for the preparation of a composition as defined above which, according to a first alternative form, is characterized in that it comprises the following stages:
 (a) a mixture comprising cerium and zirconium compounds is formed;
 (b) said mixture is brought into contact with a basic compound, whereby a precipitate is obtained;
 (c) said precipitate is heated in an aqueous medium; then
 (d) either an additive, chosen from anionic surfactants, nonionic surfactants, polyethylene glycols, carboxylic acids and their salts and surfactants of the type ethoxylates of fatty alcohols which are carboxymethylated, is first added to the medium resulting from the preceding stage and, optionally, said precipitate is subsequently separated;
 (d') or said precipitate is first separated and said additive is subsequently added to the precipitate;
 (e) the precipitate obtained in the preceding stage is milled;
 (f) the precipitate thus obtained is calcined under an inert gas or under vacuum, in a first step, at a temperature of at least 850° C., and then under an oxidizing atmosphere, in a second step, at a temperature of at least 400° C.

The invention additionally relates to another preparation process, according to a second alternative form, which is characterized in that it comprises the following stages:
 (a) a mixture comprising compounds of cerium, of zirconium and optionally of an abovementioned element is formed;
 (b) the mixture is heated, whereby a precipitate is obtained;
 (c) either an additive, chosen from anionic surfactants, nonionic surfactants, polyethylene glycols, carboxylic acids and their salts and surfactants of the type ethoxylates of fatty alcohols which are carboxy-methylated, is first added to the medium resulting from the preceding stage and, optionally, said precipitate is subsequently separated;
 (c') or said precipitate is first separated and said additive is subsequently added to the precipitate;
 (d) the precipitate obtained in the preceding stage is milled;
 (e) the precipitate thus obtained is calcined under an inert gas or under vacuum, in a first step, at a temperature of at least 850° C., and then under an oxidizing atmosphere, in a second step, at a temperature of at least 400° C.

Other characteristics, details and advantages of the invention will become even more fully apparent on reading the description which will follow and various concrete but non-limiting examples intended to illustrate it.

In the continuation of the description, the term "specific surface" is understood to mean the BET specific surface determined by nitrogen adsorption in accordance with Standard ASTM D 3663-78, drawn up from the Brunauer-Emmett-Teller method described in the periodical "The Journal of the American Chemical Society, 60, 309 (1938)".

The term "lanthanides" is understood to mean the elements from the group consisting of yttrium and the elements of the Periodic Table with atomic numbers of between 57 and 71 inclusive.

It is specified that, in the continuation of the description, unless otherwise indicated, in the ranges of values which are given, the values at the limits are included.

The contents are given as oxides, unless otherwise indicated. Cerium oxide is in the form of ceric oxide.

The compositions of the invention are of the mixed oxides type, based on cerium oxide and on zirconium oxide. They can also comprise at least one other element chosen from lanthanides other than cerium. It is thus possible to have, in this case, ternary or quaternary compositions in particular. The abovementioned element can more particularly be chosen from lanthanum, neodymium or praseodymium.

The Ce/Zr atomic ratio is at least 1. This ratio can more particularly be between 1 and 1.4.

The content of oxide of lanthanide other than cerium is generally of more than 20% by weight with respect to the whole of the composition. This content can more particularly be at most 15% and more particularly still at most 10%. It is also usually at least 1% and more particularly at least 5%.

The compositions of the invention exhibit, as main characteristic, a high reducibility which is reflected by a level of reducibility of at least 70%, preferably of at least 75%.

The reducibility of the compositions is determined by the measurement of their hydrogen consumption measured between 200° C. and 900° C. This measurement is carried out by temperature-programmed reduction using hydrogen diluted in argon. A signal is detected with a thermal conductivity detector. The consumption of the hydrogen is calculated from the missing surface area of the hydrogen signal from the baseline at 200° C. to the base at 900° C. The level of reducibility represents the percentage of cerium reduced, it being understood that ½ mol of $H_2$ consumed and measured by the method described above corresponds to 1 mol of Ce (IV) reduced.

In addition the compositions of the invention have a high specific surface. More specifically, this specific surface is at least 15 $m^2/g$, preferably at least 20 $m^2/g$. This specific surface can in particular be between 15 $m^2/g$ and 60 $m^2/g$, in particular between 20 $m^2/g$ and 60 $m^2/g$. The specific surface varies inversely with respect to the level of reducibility. Thus, for a level of 99%, the specific surface will be equal to 15 $m^2/g$ or in the vicinity of this value whereas, for a level of 70% or more, the value of the specific surface will approach 60 $m^2/g$. The specific surface values given above are those measured on the product as obtained on conclusion of the processes which will be described below.

According to another characteristic, the compositions can advantageously be provided in the form of a solid solution. The X-ray diffraction diagrams of these compositions in this case reveal, within these compositions, the existence of a single pure or homogeneous phase. This phase corresponds in fact to a crystalline structure of fluorine type, just like crystalline ceric oxide $CeO_2$, the unit cell parameters of which are more or less shifted with respect to a pure ceric oxide, thus reflecting the incorporation of the zirconium and, if appropriate, of the other element in the crystal lattice of the cerium oxide and thus the preparation of a true solid solution.

According to a specific embodiment, the compositions of the invention can finally comprise at least one precious metal, the characteristic of which is to have been introduced during the actual preparation of the compositions. This metal can be chosen in particular from platinum, rhodium, palladium, iridium, silver or gold. This embodiment exhibits the advantage of resulting in products for which the maximum reducibility temperature is considerably lowered. The maximum reducibility temperature corresponds to the temperature at which the capturing of the hydrogen is maximum. This makes it possible to have catalysts exhibiting good performances within lower temperature ranges. The amount of metal is generally at least 10 ppm by weight of metal with respect to the weight of the whole of the composition. There is a risk of not producing a significant effect with a lower amount of metal. The maximum amount of metal is not critical. It is generally at most 5% by weight; a higher amount is disadvantageous due to the cost of the metal.

The various alternative forms of the process for the preparation of the compositions of the invention will now be described.

As indicated above, the process according to the first alternative form comprises a first stage which consists in preparing a mixture, in a liquid medium, of a cerium compound, of a zirconium compound and optionally of at least one compound of the abovementioned additional element.

The mixing is generally carried out in a liquid medium which is preferably water.

The compounds are preferably soluble compounds. They can in particular be zirconium, cerium and lanthanide salts. These compounds can be chosen from nitrates, sulfates, acetates, chlorides or ceric ammonium nitrates.

Mention may thus be made, by way of examples, of zirconium sulfate, zirconyl nitrate or zirconyl chloride. Zirconyl nitrate is the most generally used. Mention may also be made in particular of cerium (IV) salts, such as nitrates or ceric ammonium nitrates, for example, which are particularly well suited in this instance. Use may be made of ceric nitrate. It is advantageous to use salts with a purity of at least 99.5% and more particularly of at least 99.9%. An aqueous ceric nitrate solution can, for example, be obtained by reaction of nitric acid with a hydrated ceric oxide prepared conventionally by reaction of a solution of a cerous salt, for example cerous nitrate, and of an aqueous ammonia solution in the presence of aqueous hydrogen peroxide solution. It is also possible, preferably, to use a ceric nitrate solution obtained according to the process for electrolytic oxidation of a cerous nitrate solution, as described in the document FR-A-2 570 087, which constitutes in this instance an advantageous starting material.

It should be noted in this instance that the aqueous solutions of cerium salts and of zirconyl salts may exhibit a degree of initial free acidity which can be adjusted by the addition of a base or of an acid. However, it is just as possible to use an initial solution of cerium and zirconium salts effectively exhibiting a degree of free acidity as mentioned above as solutions which will have been neutralized beforehand more or less exhaustively. This neutralization can be carried out by addition of a basic compound to the abovementioned mixture, so as to limit this acidity. This basic compound can, for example, be an aqueous ammonia solution or also a solution of alkali metal hydroxides (sodium, potassium, and the like) but preferably an aqueous ammonia solution.

Finally, it should be noted that, when the starting mixture comprises a cerium compound in which cerium is in the Ce (III) form, it is preferable to involve, in the course of the process, an oxidizing agent, for example aqueous hydrogen peroxide solution. This oxidizing agent can be used by being added to the reaction medium during stage (a) or during stage (b), in particular at the end of the latter.

It is also possible to use a sol as starting compound for the zirconium or cerium. The term "sol" denotes any system composed of fine solid particles of colloidal dimensions, that is to say of dimensions between approximately 1 nm and approximately 500 nm, based on a zirconium or cerium compound, this compound generally being a zirconium or cerium oxide and/or a hydrated zirconium or cerium oxide in suspension in a liquid aqueous phase, it additionally being possible for said particles optionally to comprise residual amounts of bonded or adsorbed ions, such as, for example, nitrates, acetates, chlorides or ammoniums. It should be noted that, in such a sol, the zirconium or the cerium may be found either completely in the form of colloids or simultaneously in the form of ions and in the form of colloids.

The mixture can without distinction be obtained either from compounds initially in the solid state which will be subsequently introduced into a water vessel heel, for example, or also directly from solutions of these compounds and then mixing said solutions in any order.

In the second stage (b) of the process, said mixture is brought into contact with a basic compound. This operation of bringing into contact results in the formation of a precipitate. Products of the hydroxide type can be used as base or basic compound. Mention may be made of alkali metal or alkaline earth metal hydroxides. It is also possible to use secondary, tertiary or quaternary amines. However, amines and ammonia may be preferred insofar as they reduce the risks of contamination by alkali metal or alkaline earth metal cations. Mention may also be made of urea. The basic compound is generally used in the form of an aqueous solution.

The way in which the mixture and the solution are brought into contact, that is to say the order of introduction of these, is not critical. However, this operation of bringing into contact can be carried out by introducing the mixture into the solution of the basic compound. This way of operating is preferable in order to obtain the compositions in the form of solid solutions.

The operation in which the mixture and the solution are brought into contact, or the reaction between the mixture and the solution, in particular the addition of the mixture to the solution of the basic compound, can be carried out all at once, gradually or continuously, and it is preferably carried out with stirring. It is preferably carried out at ambient temperature.

The following stage (c) of the process is the stage of heating the precipitate in an aqueous medium.

This heating can be carried out directly on the reaction medium obtained after reaction with the basic compound or on a suspension obtained after separation of the precipitate from the reaction medium, optional washing of the precipitate and placing the precipitate back in water. The temperature at which the medium is heated is at least 100° C. and more preferably still at least 130° C. The heating operation can be carried out by introducing the liquid medium into a closed chamber (closed reactor of the autoclave type). Under the temperature conditions given above, and in an aqueous medium, it is possible to specify, by way of illustration, that the pressure in the closed reactor can vary between a value of greater than 1 bar ($10^5$ Pa) and 165 bar ($1.65 \times 10^7$ Pa), preferably between 5 bar ($5 \times 10^5$ Pa) and 165 bar ($1.65 \times 10^7$ Pa). The heating can also be carried out in an open reactor for temperatures in the vicinity of 100° C.

The heating can be carried out either under air or under an inert gas atmosphere, preferably nitrogen.

The duration of the heating can vary within wide limits, for example between 1 and 48 hours, preferably between 2 and 24 hours. Likewise, the rise in temperature is carried out at a rate which is not critical and it is thus possible to reach the reaction temperature set by heating the medium, for example, between 30 minutes and 4 hours, these values being given entirely by way of indication.

The medium subjected to the heating generally exhibits a pH of at least 5. Preferably, this pH is basic, that is to say that it is greater than 7 and more particularly at least 8.

It is possible to carry out several heating operations. Thus, the precipitate obtained after the heating stage and optionally a washing operation can be resuspended in water and then another heating operation can be carried out on the medium thus obtained. This other heating operation is carried out under the same conditions as those which have been described for the first.

The following stage of the process can be carried out according to two embodiments.

According to a first embodiment, an additive, which is chosen from anionic surfactants, nonionic surfactants, polyethylene glycols, carboxylic acids and their salts and surfactants of the type ethoxylates of fatty alcohols which are carboxymethylated, is added to the reaction medium resulting from the preceding stage. As regards this additive, reference may be made to the teaching of application WO 98/45212 and use may be made of the surfactants disclosed in this document.

Mention may be made, as surfactants of the anionic type, of ethoxycarboxylates, ethoxylated or propoxylated fatty acids, in particular those of the tradename Alkamuls®, sarcosinates of formula R—C(O)N(CH$_3$)CH$_2$COO$^-$, betaines of formula RR'NH—CH$_3$COO$^-$, R and R' being alkyl or alkylaryl groups, phosphate esters, in particular those of the tradename Rhodafac®, sulfates, such as alkyl sulfates, alkyl ether sulfates and sulfated ethoxylates of alkanolamide, or sulfonates, such as sulfosuccinates, alkylbenzenesulfonates or alkylnaphthalenesulfonates.

Mention may be made, as nonionic surfactant, of acetylenic surfactants, ethoxylated or propoxylated fatty alcohols, for example those of the tradenames Rhodasurf® or Antarox®, alkanolamides, amine oxides, ethoxylated alkanolamides, long chain ethoxylated or propoxylated amines, for example those of the tradename Rhodameen®, ethylene oxide/propylene oxide copolymers, sorbitan derivatives, ethylene glycol, propylene glycol, glycerol, polyglyceryl esters and their ethoxylated derivatives, alkylamines, alkylimidazolines, ethoxylated oils and ethoxylated or propoxylated alkylphenols, in particular those of the tradename Igepal®. Mention may also be made in particular of the products cited in WO 98/45212 under the tradenames Igepal®, Dowanol®, Rhodamox® and Alkamide®.

As regards the carboxylic acids, use may in particular be made of aliphatic mono- or dicarboxylic acids and, among these, more particularly of saturated acids. Use may also be made of fatty acids and more particularly of saturated fatty acids. Mention may thus in particular be made of formic, acetic, propionic, butyric, isobutyric, valeric, caproic, caprylic, capric, lauric, myristic, palmitic, stearic, hydroxystearic, 2-ethylhexanoic and behenic acids. Mention may be made, as dicarboxylic acids, of oxalic, malonic, succinic, glutaric, adipic, pimelic, suberic, azelaic and sebacic acids.

Salts of carboxylic acids can also be used.

Finally, it is possible to use a surfactant which is chosen from those of the following type: ethoxylates of fatty alcohols which are carboxymethylated.

The term "product of the following type: ethoxylates of fatty alcohols which are carboxymethylated" is understood to mean the products composed of ethoxylated or propoxylated fatty alcohols comprising, at the chain end, a CH$_2$—COOH group.

These products can correspond to the formula:

in which R$_1$ denotes a saturated or unsaturated carbon chain, the length of which is generally at most 22 carbon atoms, preferably at least 12 carbon atoms; R$_2$, R$_3$, R$_4$ and R$_5$ can be identical and can represent hydrogen or also R$_2$ can represent a CH$_3$ group and R$_3$, R$_4$ and R$_5$ represent hydrogen; n is a nonzero integer which can range up to 50 and more particularly between 5 and 15, these values being inclusive. It should be noted that a surfactant can be composed of a mixture of products of the above formula for which R$_1$ can be respectively saturated and unsaturated or else products comprising both —CH$_2$—CH$_2$—O— and —C(CH$_3$)—CH$_2$—O— groups.

After the addition of the surfactant, the precipitate is optionally separated from the liquid medium by any known means.

Another embodiment consists in first separating the precipitate resulting from stage (c) and in then adding the surfactant additive to this precipitate.

The amount of surfactant used, expressed as percentage by weight of additive with respect to the weight of the composition, calculated as oxide, is generally between 5% and 100%, more particularly between 15% and 60%.

The following stage of the process consists in milling the precipitate obtained in the preceding stage.

This milling can be carried out in various ways.

A first way consists in carrying out a high energy milling of the wet milling type. Such a milling is carried out on the wet precipitate which was obtained either on conclusion of stage (d') or on conclusion of stage (d), in the case where this precipitate has indeed been separated from its original liquid medium. The wet milling can be carried out in a bead mill, for example.

A second way consists in carrying out a medium-energy milling by subjecting a suspension of the precipitate to shearing, for example using a colloid mill or a stirring turbine. This suspension can be an aqueous suspension which was obtained after redispersing, in water, the precipitate obtained on conclusion of stages (d) or (d'). This can also be the suspension directly obtained at the end of stage (d) after the addition of the surfactant, without the precipitate having been separated from the liquid medium.

On conclusion of the milling, the product obtained can optionally be dried, for example by passing into an oven.

The final stage of the process is a calcination stage.

This calcination is carried out in two steps.

In a first step, the calcination is carried out under an inert gas or under vacuum. The inert gas can be helium, argon or nitrogen. The vacuum is generally a low vacuum with an oxygen partial pressure of less than $10^{-1}$ mbar. The calcination temperature is at least 850° C. A risk exists that a temperature below this value will not result in a product exhibiting the characteristics given above of reducibility. The increase in the calcination temperature results in an increase in the reducibility, which can reach values of 99% towards the higher temperatures. In addition, the temperature is set at a value taking into account the fact that the specific surface of the product decreases as the calcination temperature employed increases. Thus, generally, the maximum calcination temperature is at most 1100° C. as there is a risk beyond this point of the specific surface being inadequate. The time for this first calcination is generally at least 2 hours, preferably at least 4 hours and in particular at least 6 hours. An increase in this time usually results in an increase in the level of reducibility. Of course, the time can be set according to the temperature, a low calcination time requiring a higher temperature.

In a second step, a second calcination is carried out under an oxidizing atmosphere, for example under air. In this case, the calcination is generally carried out at a temperature of at least 400° C. for a time which is generally at least 30 minutes. A temperature of less than 400° C. may make it difficult to remove the additives used during stages (d) or (d') described above. It is preferable not to exceed a calcination temperature of 900° C.

The preparation process can also be carried out according to a second alternative form which will now be described.

The first stage (a) of the process according to this alternative form is identical to that of the process according to the first alternative form and thus that which was described above on this subject likewise applies here.

The second stage of the process, stage (b), is a stage in which the mixture resulting from the first stage is heated. The temperature at which this heating or heat treatment, also known as thermal hydrolysis, is carried out can be between 80° C. and the critical temperature of the reaction medium, in particular between 80 and 350° C., preferably between 90 and 200° C.

This treatment can be carried out, depending on the temperature conditions selected, either at standard atmospheric pressure or under pressure, such as, for example, the saturated vapor pressure corresponding to the temperature of the heat treatment. When the treatment temperature is chosen to be grater than the reflux temperature of the reaction mixture (that is to say, generally greater than 100° C.), for example chosen between 150 and 350° C., the operation is then carried out by introducing the liquid mixture comprising the abovementioned entities into a closed chamber (closed reactor, more commonly referred to as autoclave), the pressure necessary then resulting only from the heating alone of the reaction medium (autogenous pressure). Under the temperature conditions given above, and in an aqueous medium, it is thus possible to specify, by way of illustration, that the pressure in the closed reactor varies between a value of greater than 1 bar ($10^5$ Pa) and 165 bar ($165 \times 10^5$ Pa), preferably between 5 bar ($5 \times 10^5$ Pa) and 165 bar ($165 \times 10^5$ Pa). It is, of course, also possible to exert an external pressure which is then additional to that resulting from the heating.

The heating can be carried out either under an atmosphere of air or under an atmosphere of inert gas, preferably nitrogen.

The duration of the treatment is not critical and can thus vary within wide limits, for example between 1 and 48 hours, preferably between 2 and 24 hours.

On conclusion of the heating stage, a solid precipitate is recovered and can be separated from its medium by any conventional solid/liquid separating technique, such as, for example, filtration, separation by settling, draining or centrifuging.

It can be advantageous, after the heating stage, to introduce a base, such as, for example, an aqueous ammonia solution, into the precipitation medium. This makes it possible to increase the recovery yields of the precipitated entity.

The following stages of the process, stages (c), (c'), (d) and (f) are identical respectively to stages (d), (d') (e) and (f) of the first alternative form and, here again, that which was described above on this subject likewise applies.

So as to obtain a composition according to the specific embodiment which was described above, it is possible to add, to the precipitate resulting from stage (d) or (d') of the first alternative form or from stage (c) or (c') of the second, a precious metal which, as indicated above, can be chosen in particular from platinum, rhodium, palladium, iridium, silver or gold. This addition can be carried out in particular by using the impregnation technique. The specific surface values given above apply to the compositions resulting from the process according to the two alternative forms which have just been described and which were calcined within the abovementioned temperature ranges.

The compositions of the invention as described above or as obtained by the process mentioned above are provided in the form of powders but they can optionally be formed in order to be provided in the form of granules, beads, cylinders or honeycombs of variable dimensions. These compositions can be applied to any support commonly used in the field of catalysis, that is to say thermally inert supports in particular. This support can be chosen from alumina, titanium oxide, cerium oxide, zirconium oxide, silica, spinels, zeolites, silicates, crystalline silicoaluminum phosphates or crystalline aluminum phosphates.

The compositions can also be used in catalytic systems. These catalytic systems can comprise a coating (wash coat), possessing catalytic properties and based on these compositions, on a substrate of the, for example, metal or ceramic monolith type. The coating can itself also comprise a support of the type of those mentioned above. This coat is obtained by mixing the composition with the support, so as to form a suspension which can subsequently be deposited on the substrate.

These catalytic systems and more particularly the compositions of the invention can have a great many applications. They are therefore particularly well suited to, and thus usable in, the catalysis of various reactions, such as, for example, dehydration, hydro-sulfurization, hydrodenitrification, desulfurization, hydrodesulfurization, dehydrohalogenation, reforming, steam reforming, cracking, hydrocracking, hydrogenation, dehydrogenation, isomerization, dismutation, oxychlorination, dehydrocyclization of hydrocarbons or other organic compounds, oxidation and/or reduction reactions, the Claus reaction, treatment of exhaust gases from internal combustion engines, demetallation, methanation, the shift conversion or the catalytic oxidation of the soot emitted by internal combustion engines, such as diesel or petrol engines operating under lean conditions. Finally, the catalytic systems and the compositions of the invention can be used as NOx traps.

In the case of these uses in catalysis, the compositions of the invention can be employed in combination with precious metals. The nature of these metals and the techniques for the incorporation of the latter in these compositions are well known to a person skilled in the art. For example, the metals can be platinum, rhodium, palladium or iridium. They can in particular be incorporated in the compositions by impregnation.

Among the uses mentioned, the treatment of exhaust gases from internal combustion engines (automobile afterburning catalysis) constitutes a particularly advantageous application.

Examples will now be given.

The evaluation tests which are mentioned below were carried out under the following conditions.

Three-way Catalytic Test

This test makes it possible to evaluate, under dynamic conditions (oscillation frequency of 1 Hz), the performances of the three-way catalysts in the powder form with regard to the removal of the pollutants CO, NO and hydrocarbons. Several measurements are carried out under isothermal conditions while varying the richness of the gas mixture. The evaluation temperature is 460° C. and the weight of catalyst is 20 mg, as a mixture with 150 mg of SiC used as inert diluent. The catalytic performances are given in COP (crossover point), which is defined as the point of intersection of the conversion curves for CO and NO as a function of the richness of the mixture. The test is carried out on a composition of the invention which has been impregnated with a rhodium nitrate solution, followed by activation under air at 500° C. for 2 hours.

Level of Reducibility

This level is calculated employing the principle indicated above, in this instance using an MI-100 Altamira device.

More specifically, use is made of hydrogen as reducing gas at 10% by volume in argon with a flow rate of 30 ml/min. The signal is detected with a thermal conductivity detector at 70 mA. The experimental protocol is as follows: the amount of sample weighed out is 200 mg in a pretared receptacle. The sample is subsequently introduced into a quartz cell containing quartz wool in the bottom. The sample is finally covered with quartz wool and positioned in the tubular furnace of the measuring device. The temperature program is as follows:

oxidation: rise in temperature up to 500° C. with a rise ramp at 10° C./min under $O_2$ at 5% in He;
stationary-phase of 30 min and then descent to 30° C.;
treatment at T=30° C. under Ar for 20 min;
reduction: rise in temperature up to 900° C. with a rise ramp at 20° C./min under $H_2$ at 10% in Ar;
calibration;
treatment under Ar from 900° C. to 30° C.

EXAMPLE 1

This example relates to the preparation of a composition based on cerium oxide and on zirconium oxide in the respective proportions by weight of 58/42.

525 ml of zirconium nitrate (80 g/l) and 230 ml of a ceric nitrate solution ($Ce^{4+}$236.5 g/l, $Ce^{3+}$=15.5 g/l and free acidity =0.7N) are introduced into a stirred beaker. The mixture is subsequently made up with distilled water so as to obtain 1 liter of a solution of nitrates.

253 ml of an aqueous ammonia solution are introduced into a stirred round-bottom reactor and the solution is subsequently made up with distilled water so as to obtain a total volume of 1 liter.

The solution of nitrates is introduced over one hour into the reactor with constant stirring.

The solution obtained is placed in a stainless steel autoclave equipped with a stirrer. The temperature of the medium is brought to 150° C. for 2 hours with stirring.

The suspension thus obtained is then filtered on a Buchner funnel. A precipitate comprising 23.4% by weight of oxide is recovered.

100 g of this precipitate are withdrawn.

At the same time, an ammonium laurate gel was prepared under the following conditions: 250 g of lauric acid are introduced into 135 ml of aqueous ammonia (12 mol/l) and 500 ml of distilled water, and then the mixture is homogenized using a spatula.

28 g of this gel are added to 100 g of the precipitate and then the combined product is kneaded until a homogeneous paste is obtained.

The product thus obtained is subsequently subjected to two calcinations under the following conditions.

The first calcination takes place under nitrogen with a flow rate of 300 cc/min at a temperature of 900° C. for 4 h in the stationary phase. The product is subsequently brought back to ambient temperature. The second calcination is carried out in a mixture comprising 10% of oxygen in nitrogen with a flow rate of 300 $cm^3$/min at a temperature of 500° C. for 2 h in the stationary phase.

The product thus obtained exhibits a specific surface of 59 $m^2$/g and a level of reducibility of 88%; the maximum reducibility temperature is 505° C.

The three-way catalytic test indicates a conversion of 100% at the COP for a product impregnated with 0.1% by weight of rhodium.

EXAMPLE 2

This example relates to the preparation of a composition based on cerium oxide and on zirconium oxide in the respective proportions by weight of 58/42.

The preparation is carried out as in Example 1 until the homogeneous paste is obtained.

The product thus obtained is subsequently subjected to two calcinations under the following conditions.

The first calcination takes place under nitrogen with a flow rate of 300 $cm^3$/min at a temperature of 1100° C. for 6 h in the stationary phase. The product is subsequently brought back to ambient temperature. The second calcination is carried out in a mixture comprising 10% of oxygen in nitrogen with a flow rate of 300 $cm^3$/min at a temperature of 500° C. for 2 h in the stationary phase.

The product thus obtained exhibits a specific surface of 20 $m^2$/g and a level of reducibility of 99%; the maximum reducibility temperature is 540° C.

EXAMPLE 3

This example relates to the preparation of a composition based on cerium oxide, on zirconium oxide, on lanthanum oxide and on praseodymium oxide in the respective proportions by weight of 60/30/3/7.

375 ml of zirconium nitrate (80 g/l), 121 ml of cerium nitrate in the III oxidation state (496 g/l), 6.6 ml of lanthanum nitrate (454 g/l) and 14 ml of praseodymium nitrate (500 g/l) are introduced into a stirred beaker. The mixture is subsequently made up with distilled water so as to obtain 1 liter of a solution of nitrates.

200 ml of an aqueous ammonium solution (12 mol/l) and 302 ml of aqueous hydrogen peroxide solution (110 volumes) are introduced into a stirred round-bottomed reactor and the solution is subsequently made up with distilled water so as to obtain a total volume of 1 liter.

The preparation is subsequently carried out as in Example 1 and the suspension obtained on conclusion of the autoclave treatment is then filtered on a Büchner funnel. A precipitate comprising 30.5% by weight of oxide is recovered.

100 g of this precipitate are withdrawn and 36.5 g of an ammonium laurate gel, prepared as in Example 1, are added thereto until a homogeneous paste is obtained.

The product thus obtained is subsequently subjected to two calcinations under the following conditions.

The first calcination takes place under nitrogen with a flow rate of 300 cm$^3$/min at a temperature of 900° C. for 4 h in the stationary phase. The product is subsequently brought back to ambient temperature. The second calcination is carried out in a mixture comprising 10% of oxygen in nitrogen with a flow rate of 300 cm$^3$/min at a temperature of 500° C. for 2 h in the stationary phase.

The product thus obtained exhibits a specific surface of 40 m$^2$/g and a level of reducibility of 99%; the maximum reducibility temperature is 570° C.

EXAMPLE 4

This example relates to the preparation of a composition based on cerium oxide and on zirconium oxide in the respective proportions by weight of 58/42 which comprises 100 ppm of palladium introduced during the preparation of this composition.

The preparation is carried out as in Example 1 until the homogeneous paste is obtained.

The paste is then impregnated with 100 ppm by weight of palladium with the following protocol: the percentage of total oxides (TO) is determined beforehand by a loss on ignition measurement. The corresponding amount of Pd(NH$_3$)$_4$(NO$_3$)$_2$ mother solution comprising 4.5% by weight of Pd is calculated from the percentage of TO. For a weight of 100 g of TO comprising 100 ppm of Pd, it is necessary to withdraw 0.222 g of mother solution. This withdrawal operation is carried out by volume using a micropipette. The density of the mother solution is determined by weighing. The density obtained is 1.0779. The volume of mother solution to be withdrawn is then 43 µl. The volume of mother solution is subsequently introduced into a 25 ml flask and diluted with deionized water. This solution is brought into contact with the paste, suspended beforehand in deionized water. The supernatant solution is then slowly evaporated on a sand bath.

The product thus obtained is subsequently subjected to two calcinations under the following conditions.

The first calcination takes place under nitrogen with a flow rate of 300 cm$^3$/min at a temperature of 900° C. for 4 h in the stationary phase. The product is subsequently brought back to ambient temperature. The second calcination is carried out in a mixture comprising 10% of oxygen in nitrogen with a flow rate of 300 cm$^3$/min at a temperature of 500° C. for 2 h in the stationary phase.

The product thus obtained exhibits a specific surface of 62 m$^2$/g and a level of reducibility of 88%; the maximum reducibility temperature is 230° C.

COMPARATIVE EXAMPLE 5

The preparation is carried out as in Example 1 until the homogeneous paste is obtained.

The product is subsequently calcined under air at a temperature of 900° C. for 4 h in the stationary phase.

The product thus obtained exhibits a specific surface of 49 m$^2$/g and a level of reducibility of 63%; the maximum reducibility temperature is 560° C.

The three-way catalytic test indicates a conversion of 90% at the COP for a product impregnated with 0.1% by weight of rhodium.

COMPARATIVE EXAMPLE 6

The preparation is carried out as in Example 1 until the homogeneous paste is obtained.

The product is subsequently calcined under air at a temperature of 1100° C. for 6 h in the stationary phase.

The product thus obtained exhibits a specific surface of 6 m$^2$/g and a level of reducibility of 62%; the maximum reducibility temperature is 610° C.

COMPARATIVE EXAMPLE 7

The preparation is carried out as in Example 1 until the homogeneous paste is obtained.

The product is subsequently calcined in a gas mixture comprising 10% of hydrogen in nitrogen and at a flow rate of 300 cm$^3$/min at a temperature of 1100° C. for 4 h in the stationary phase.

The product thus obtained exhibits a specific surface of 7 m$^2$/g and a level of reducibility of 85%; the maximum reducibility temperature is 575° C.

What is claimed is:

1. A composition based on cerium oxide and on zirconium oxide in a Ce/Zr atomic proportion of at least 1, wherein the composition is produced by a process comprising a first calcination step and a second calcination step, exhibits a level of reducibility of at least 70%, and has a specific surface area of at least 15 m$^2$/g, wherein the temperature of the first calcination step is at least 850° C., and wherein the temperature of the second calcination step is at least 400° C.

2. The composition as claimed in claim 1, wherein the first calcination step is performed in an inert gas atmosphere or under a vacuum, and the second calcination step is performed in an oxidizing atmosphere.

3. The composition as claimed in claim 2, wherein the temperature of the first calcination step does not exceed 1100° C.

4. The composition as claimed in claim 3, wherein the temperature of the second calcination step does not exceed 900° C.

5. The composition as claimed in claim 1, wherein the specific surface area is at least 15 m$^2$/g after calcining at least once at a temperature of at least 900° C.

6. The composition as claimed in claim 1, wherein the specific surface area is at least 15 m$^2$/g after calcining at least once at a temperature of about 1100° C.

7. The composition as claimed in claim 1, wherein the level of reducibility is of at least 75%.

8. The composition as claimed in claim 7, wherein the specific surface is of at least 20 m$^2$/g.

9. The composition as claimed in claim 8, wherein the Ce/Zr atomic proportion is of at most 1.4.

10. The composition as claimed in claim 1, further comprising at least one lanthanide element other than cerium.

11. The composition as claimed in claim 1, further comprising at least one precious metal.

12. The composition as claimed in claim 11, further comprising at least one lanthanide element other than cerium.

13. The composition as claimed in claim 12, wherein the precious metal is platinum, rhodium, palladium, iridium, silver or gold.

14. A process for the preparation of a composition as defined in claim 1, comprising the stages of:
 (a) forming a mixture comprising compounds of cerium, of zirconium and optionally of at least one lanthanide element other than cerium;
 (b) adding to said mixture a basic compound, whereby a precipitate is obtained;
 (c) heating said precipitate in an aqueous medium; then (d) either adding first to the medium obtained in stage c) an additive which is an anionic surfactant, nonionic surfactant, polyethylene glycol, carboxylic acid, salt of a carboxylic acid, ethoxylate of a fatty alcohol surfactant which is carboxymethylated, and, optionally, subsequently separating said precipitate; or
 (d') separating first said precipitate and subsequently adding said additive to the precipitate;
 (e) milling the precipitate obtained in the preceding stage; and
 (f) calcining the precipitate thus obtained in stage e) under an inert gas or under vacuum, in a first step, at a temperature of at least 850° C., and then under an oxidizing atmosphere, in a second step, at a temperature of at least 400° C.

15. The process as claimed in claim 14, wherein the compound of zirconium, of cerium and of at least one lanthanide element other than cerium, is a nitrate, sulfate, acetate, chloride or ceric ammonium nitrate.

16. The process as claimed in claim 15, wherein the heating of the precipitate from stage (c) is carried out at a temperature of at least 100° C.

17. The process as claimed in claim 14, wherein a wet milling is carried out.

18. The process as claimed in claim 14, wherein the milling is carried out by subjecting a suspension of the precipitate to shearing.

19. The process as claimed in claim 14, wherein a precious metal is added to the precipitate resulting from stage (d) or (d') or from stage (c).

20. A process for the preparation of a composition as claimed in claim 1, comprising the stages of:
 (a) forming a mixture comprising compounds of cerium, of zirconium and optionally of at least one lanthanide element other than cerium;
 (b) heating the mixture, whereby a precipitate in a medium is obtained;
 (c) either adding first to the precipitate in the medium obtained in stage (b) an additive which is a nonionic surfactant, polyethylene glycol, carboxylic acid, salt of a carboxylic acid, ethoxylate of a fatty alcohol surfactant which is carboxymethylated, and, optionally, subsequently separating said precipitate; or (c') or separating first said precipitate and subsequently adding said additive to the precipitate;
 (d) milling the precipitate obtained in the preceding stage; and
 (e) calcining the precipitate thus obtained under an inert gas or under vacuum, in a first step, at a temperature of at least 850° C., and then under an oxidizing atmosphere, in a second step, at a temperature of at least 400° C.

21. The process as claimed in claim 20, wherein the compound of zirconium, of cerium and of at least one lanthanide element other than cerium, is a nitrate, sulfate, acetate, chloride or ceric ammonium nitrate.

22. The process as claimed in claim 21, wherein the heating of the mixture from stage (b) is carried out at a temperature of at least 100° C.

23. The process as claimed in claim 20, wherein a precious metal is added to the precipitate resulting from stage (d) or from stage (c) or (c').

24. A catalytic system, comprising a composition as defined in claim 1.

25. A process for the treatment of exhaust gases from internal combustion engines, comprising the step of treating said gases with a catalytic system as claimed in claim 24.

* * * * *